C. SCHMIDT.
UNIVERSAL SHAFT COUPLING.
APPLICATION FILED JAN. 2, 1909.
916,032.
Patented Mar. 23, 1909.
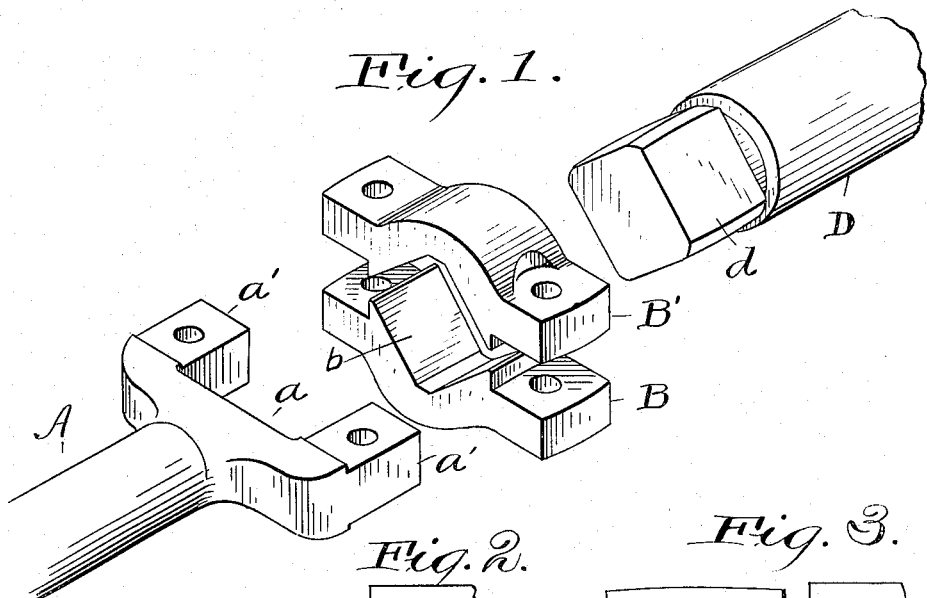
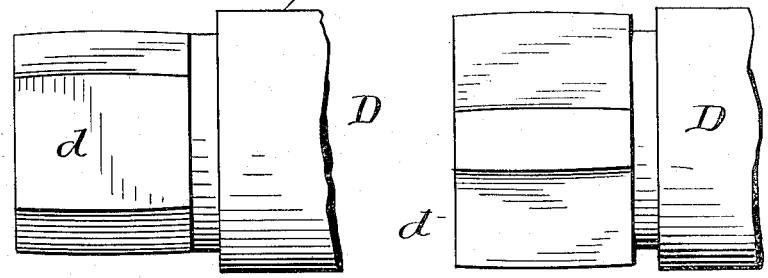
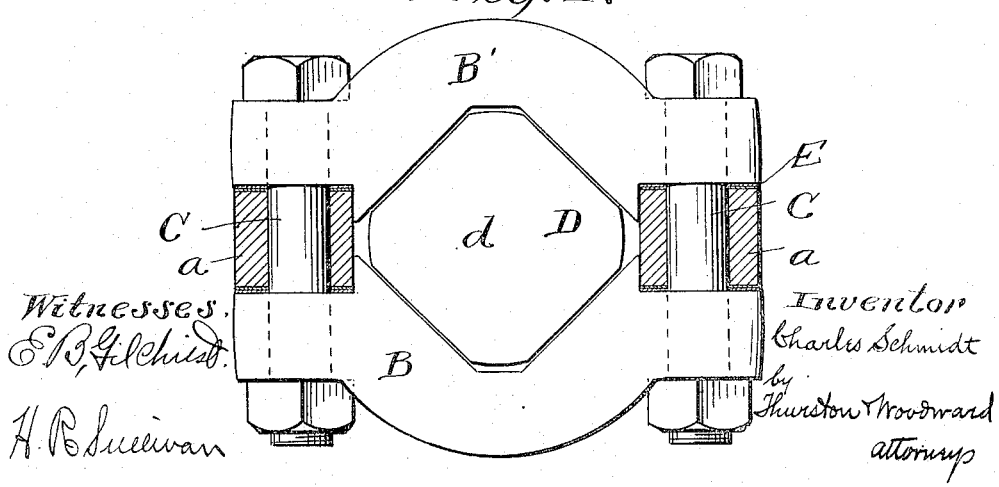

UNITED STATES PATENT OFFICE.

CHARLES SCHMIDT, OF CLEVELAND, OHIO, ASSIGNOR TO THE PEERLESS MOTOR CAR COMPANY, OF CLEVELAND, OHIO, A CORPORATION OF WEST VIRGINIA.

UNIVERSAL SHAFT-COUPLING.

No. 916,032.  Specification of Letters Patent.  Patented March 23, 1909.

Application filed January 2, 1909. Serial No. 470,372.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Universal Shaft-Couplings, of which the following is a full, clear, and exact description.

This invention is designed with special reference to its use for operatively connecting the ends of approximately alined shafts, such as are commonly employed on automobiles, for transmitting power from the engine driving axle.

Simplicity, efficiency, and the capacity to easily take up wear are the main objects attained.

In the drawing Figure 1 represents disconnected parts of the invention. Fig. 2 is a side view of the end of shaft D. Fig. 3 is a similar view looking at the shaft, but at right angles to the view shown in Fig. 2. Fig. 4 is a sectional view of the assembled parts of the device, this section being taken through the longitudinal fingers $a'$ on shaft A.

Referring to the parts by letters, A represents one of the transmission shafts having, at its end, a cross bar $a$, which is provided at its ends with longitudinally extended fingers $a'$.

B, B' represent two socket bars which, when the parts are assembled, lie on opposite sides of and embrace the fingers $a'$, to which they are fastened by bolts C. In the opposed faces of these two bars, when they are so secured, is an approximately square socket produced by forming in these bars between their ends the approximately triangular recesses $b$.

D represents the other shaft; and its end $d$ is made approximately square, so as to fit with some looseness in the sockets B, B'. While the socket and the end D have been referred to as approximately square, they are actually octagonal, four sides being, however, extremely narrow, and formed by merely cutting off the angles formed by the intersections of the broad flat sides. Another peculiarity of the construction of the end $d$ of the shaft D, is that the broad flat sides thereof are slightly convex longitudinally. This permits a slight rocking of the end $d$ in the socket without affecting the operative connection between the parts. This rocking, however, causes some wear which would render the device less satisfactory if some way were not provided for taking up this wear easily. The means provided consist of a plurality of thin metal shims E which, when the parts are first assembled, is placed between the socket bars B, B' and the fingers $a'$. As the socket or shaft wear, so that there is an unsatisfactory degree of looseness, these shims may be taken out as required to restore the device to the required condition.

Having described my invention, I claim:

The combination of a shaft having at one end a cross bar with longitudinally extended fingers at its ends, and two socket bars which at their ends embrace and are secured to said fingers and have in their opposed faces, when so secured, approximately triangular recesses, thereby making an approximately square socket with a shaft having its end approximately square and somewhat loosely fitted into said socket.

In testimony whereof, I hereunto affix my signature in the presence of two witnesses.

CHARLES SCHMIDT.

Witnesses:
 E. L. THURSTON,
 H. R. SULLIVAN,